(12) United States Patent
Balistreri

(10) Patent No.: US 7,287,732 B2
(45) Date of Patent: Oct. 30, 2007

(54) LEVELING DEVICE

(76) Inventor: Thomas W. Balistreri, 3455 Woodhead Dr., Northbrook, IL (US) 60062

( * ) Notice: Subject to any disclaimer, the term of this patent is extended or adjusted under 35 U.S.C. 154(b) by 324 days.

(21) Appl. No.: 11/140,827

(22) Filed: May 31, 2005

(65) Prior Publication Data

US 2006/0266896 A1    Nov. 30, 2006

(51) Int. Cl.
*F16M 11/24* (2006.01)
(52) U.S. Cl. ............... 248/188.4; 248/188.2; 248/181.1; 248/650; 248/656; 248/677; 16/32; 16/35 R; 16/42 R
(58) Field of Classification Search ............ 248/188.2, 248/188.4, 650, 656, 677, 181.1; 16/32, 16/35 R, 42 R
See application file for complete search history.

(56) References Cited

U.S. PATENT DOCUMENTS

| | | | |
|---|---|---|---|
| 842,641 A | | 1/1907 | Fernau |
| 1,934,746 A | * | 11/1933 | Stoddard ................. 248/188.4 |
| 2,254,973 A | | 9/1941 | Nalle |
| 2,295,911 A | * | 9/1942 | Page ............................ 16/19 |
| 2,327,050 A | * | 8/1943 | Kotler ..................... 248/188.4 |
| 2,680,326 A | * | 6/1954 | Sultan ..................... 248/188.4 |
| 3,150,853 A | * | 9/1964 | Lisbin ..................... 248/188.4 |
| 3,175,795 A | * | 3/1965 | Adams ..................... 248/188.4 |
| 3,191,212 A | | 6/1965 | Reiss, Sr. et al. |
| 3,356,327 A | * | 12/1967 | Schreyer et al. ......... 248/188.4 |
| 3,436,045 A | * | 4/1969 | Anspaugh ..................... 410/46 |
| 3,722,026 A | | 3/1973 | Wilhelmi |
| 3,815,852 A | | 6/1974 | May |
| 4,575,034 A | * | 3/1986 | Tobey ..................... 248/188.9 |
| 5,104,075 A | | 4/1992 | Freeman |
| 5,332,182 A | * | 7/1994 | Weisz et al. ............. 248/188.4 |
| 5,653,417 A | | 8/1997 | DeBarber et al. |
| 5,988,574 A | * | 11/1999 | Podgorski et al. ....... 248/188.4 |
| 6,138,979 A | | 10/2000 | Morman |
| 6,186,453 B1 | * | 2/2001 | Redbone .................. 248/188.4 |
| 6,327,985 B1 | * | 12/2001 | Frenkler et al. ........ 108/147.19 |
| 6,407,351 B1 | | 6/2002 | Meyer et al. |
| 6,520,459 B2 | | 2/2003 | Burr |
| 6,742,750 B2 | | 6/2004 | Burr |
| 6,910,666 B2 | * | 6/2005 | Burr ........................ 248/188.4 |
| 2001/0019096 A1 | | 9/2001 | Andreoli et al. |
| 2006/0091269 A1 | * | 5/2006 | Hanson ................... 248/188.4 |

* cited by examiner

*Primary Examiner*—Carl D. Friedman
*Assistant Examiner*—Nkeisha J. Dumas
(74) *Attorney, Agent, or Firm*—Michael R. McKenna

(57) ABSTRACT

An improved leveling device having a unique elongated adjusting leg and locking hub which permits the secure leveling of an appliance without the use of extraneous tools.

22 Claims, 4 Drawing Sheets

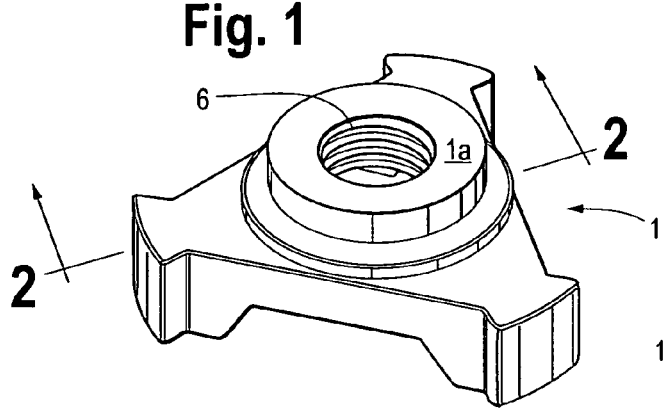
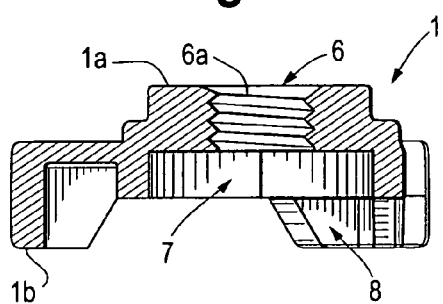
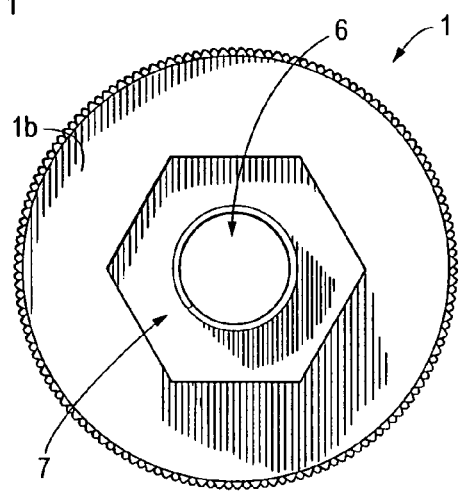
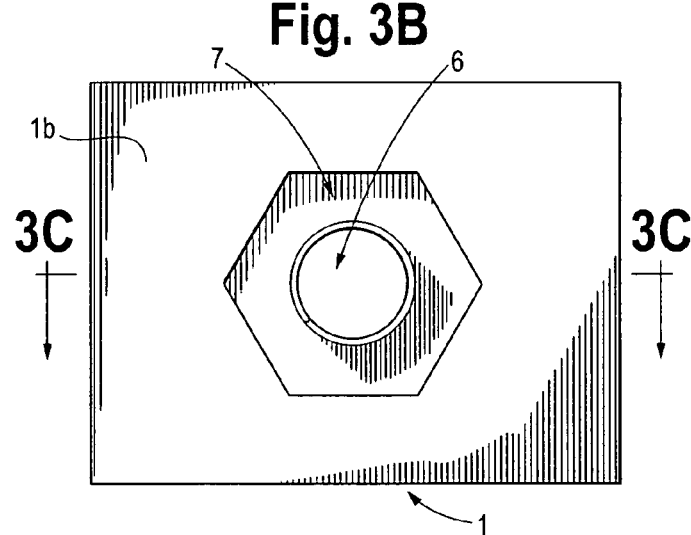
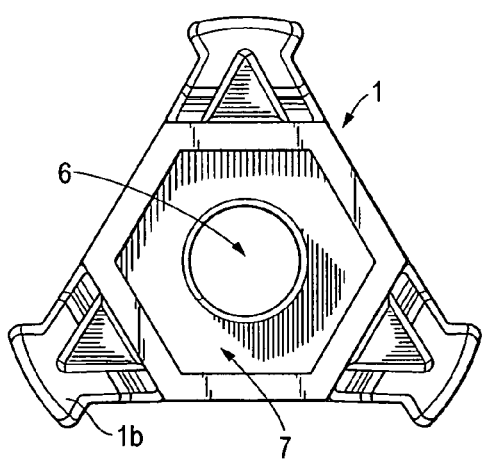
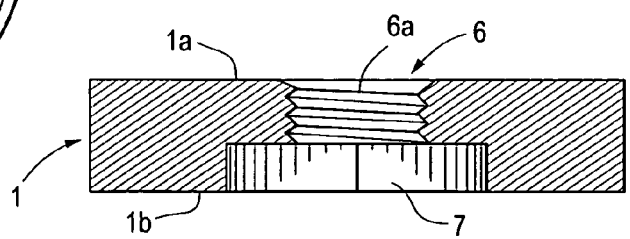

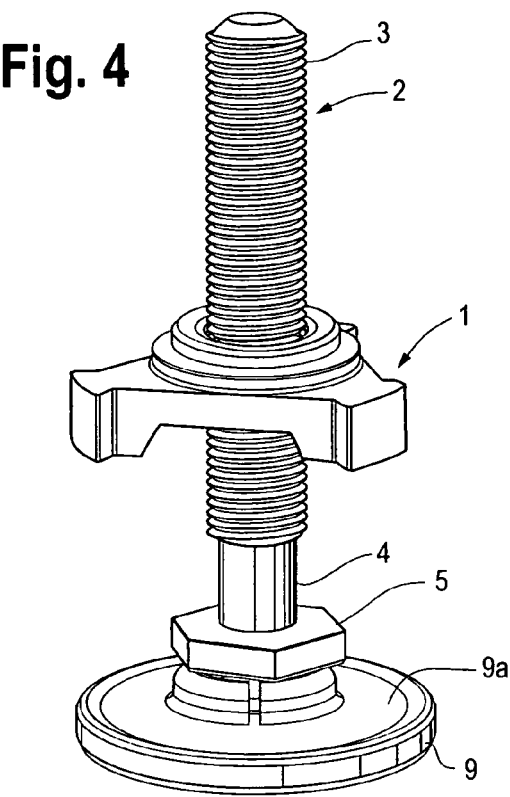
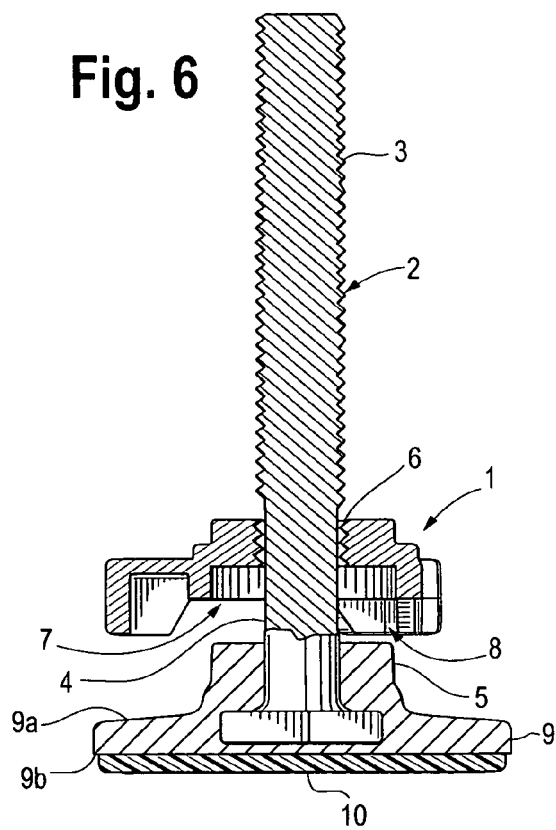
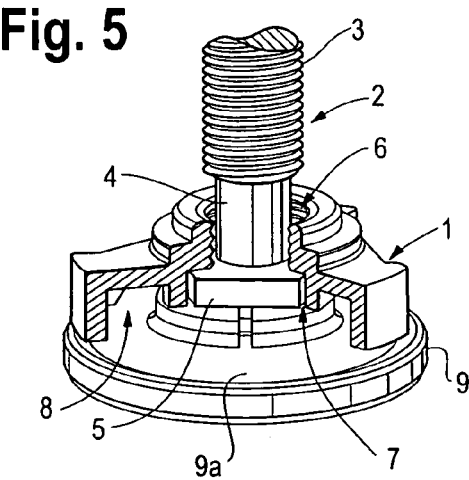

LEVELING DEVICE

BACKGROUND OF THE INVENTION

This invention relates to an improved leveling device having a unique elongated adjusting leg and locking hub which permits the secure leveling of an appliance without the use of extraneous tools.

Leveling devices are a common component to any product that requires leveling or height adjustment. These devices are referred to in such ways as leveling legs, leveling pads, leveling mounts, support pads, etc. They come in varying sizes and shapes depending on the size and weight of the appliance for which they are used (weight ranging from several pounds to many tons). Leveling legs are typically made of a rigid base which can have a soft (rubber) cushioned base. When used, the cushioned base serves to absorb vibration as well as prevent sliding movement of the appliance. Most often, a threaded shaft is affixed to the base and perpendicular to the base, and attached in a manner as to not allow the shaft to rotate or swivel independent of the base. This invention is intended for use on moderately light appliance such as large appliances (i.e. washers and dryers), office furniture, light manufacturing machines, and the like.

Broadly stated, the invention is a unique design for a leveling leg, which is a device attached to the lower corners of equipment and apparatus, such as but not limited to large appliances, office furniture, business machines, manufacturing and communication machines and equipment, display and storage equipment, and the like. The purpose of a leveling leg is to provide a means to level or adjust the height of such equipment and apparatus. For purposes of simplicity, I will refer to the equipment or apparatus to which the leveling leg is attached as the "appliance."

In the preferred aspects of the improved leveling device of the instant invention has three distinct components, which are assembled to act as a single leveling leg. The three components include a "base", "leg", and "locking hub." The base, leg and locking hub can be construed as a single material component or as a multiple material assembly. If constructed as a multiple material assembly, each can use any combination of metal, plastic, or rubber and each can be manufactured using a variety of methods common to those types of materials. The geometry of the three components can be altered to a fair degree and still provide the uniqueness of the invention.

As shown in FIGS. 7-11, the base and leg are attached to one another via a snap-fit or some other mechanical locking means. The interface between the base and the leg allows the base to spin and swivel independently from the leg. The base acts as the bearing surface of the leveling leg.

The leg is a threaded shaft having four distinct areas. Working from the bottom up, the lowest portion of the leg allows for a rotating and swivel connection to the base. The next portion has an integral hex-nut that allows the locking hub to affix to and rotate to the leg. It will be readily appreciated by those skilled in the art that any irregularly shaped collar may be substituted for the hex-nut shape with a locking hub adapted to fit the irregularly shaped collar. The next portion is un-threaded and allows the locking hub to transition from rotating the leg to threading on to the last portion of the leg, which is the threaded portion. The threaded portion of the leg allows for the leg to be threaded into the bottom corner of the appliance (the appliance has a threaded receptacle) so that when the leg is rotated, the corner of the appliance will travel up or down. The threaded portion of the leg also allows for a threaded interface with the locking hub.

The locking hub is positioned on the leg above the hex-nut portion of the leg. The locking hub has an integral female receptacle that fits over the hex-nut portion of the leg in a wrench-like manner that allows for the threads of the leg to be rotated thus creating the up or down travel of the appliance as previously mentioned. The locking hub also has internal threads allowing it to be threaded up the leg and tightly forced against the bottom of the appliance. In doing so, the locking hub acts as a locking mechanism, locking the leg in position and preventing it from inadvertently turning and altering the leveling or height of the appliance.

Alternative technology is available in the form of U.S. Pat. No. 6,742,750 which was issued in 2004 to Burr for an adjustable leveling mount for equipment having a threaded ball and socket support stud and an adjusting jam nut; U.S. Pat. No. 6,520,459 issued in 2003 to Burr as well for a leveling mount with a polygonal projecting block and an adjusting jam nut; U.S. Pat. No. 3,815,852 issued to May in 1974 for an apparatus for leveling and limiting the motion of heavy machines having a threaded vertical support element with a locking nut and support block; U.S. Pat. No. 2,254,973 issued in 1940 to Nalle for an adjustable caster construction having a polygonal adjustment flange; U.S. Pat. No. 6,407,351 issued to Meyer et al. in 2002 for a thread covering assembly for adjustable support feet and the like; U.S. Pat. No. 5,653,417 issued in 1997 to DeBarber et al. for a scale with a locking foot having an adjustable assembly leveling apparatus with a locking feature to prevent the loosening of the adjustment; and a universally adjustable foot for the legs of billiard tables and similar articles is disclosed in U.S. Pat. No. 842,641 which issued in 1907 to Fernau.

In addition, the inventor is aware of one company, Barry Controls, of Brighton, Mass., which manufacturers leveling devices under the trademark Vlier®, offering leveling products with a base connected to the threaded shaft by means of a ball socket so that the base can swivel and turn independent of the threaded shaft. The threaded shaft also has an integral hexagon nut that is used to turn the threaded shaft to adjust the height. Vlier® products require the use of a hand tool such as a wrench or pliers to turn the threaded shaft.

The principal disadvantage of such devices is the need to employ an extraneous tool to effect the leveling. As a means of locking the shaft in position, existing products use a common hex-nut to run up the threaded shaft and tighten against the appliance. Again, the use of a hand tool such as wrench or pliers is needed to tighten the nut against the appliance.

Vlier® does offer an optional "knob" which can be used to rotate the threaded shaft but it does not have the means to threat up the shaft and against the appliance in order to lock the shaft in position.

To alleviate this problem, and others which will become apparent from the disclosure which follows, the present invention conveniently allow the locking hub to both rotate the leg independent of the threads of the leg and alternatively engage the threaded portion of the leg, whereby the locking hub can threat up the shaft of the leg and against the appliance in order to lock the leg in position.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

Unlike the foregoing devices which teach leveling devices requiring the use of extraneous tools, the locking hub of the present invention is a single component that is used both as a wrench to turn the threaded leg for height adjustment and also acts as the locking nut to prevent the leveling leg from going out of height adjustment; the invention avoids the need to use a separate hand tool to tighten the locking nut feature; and the design geometry of the interface between the base and the leg used in the invention is shorter (i.e. a spherical segment of a sphere) than the full ball socket design used by Vlier®. This is important to the invention because the leg incorporates an unthreaded portion between the threads and the integral hex-nut that allows the locking hub to transition from acting as a wrench to acting as a threaded lock nut. The unthreaded portion of the shaft inherently adds height to the leveling leg. Thus, utilizing the spherical segment of a sphere in combination with the unthreaded portion of the leg allows the appliance to be adjusted approximately as low to the floor as existing products currently allow.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

The invention relates to an improved leveling device for use with an appliance having a threaded receptacle comprising an elongated adjusting leg with an upper longitudinal threaded section adapted for engaging the threaded receptacle, an intermediate section free of threads, and a lower section with an integral collar, and a locking hub. The locking hub has a plurality of axial passageways extending from a bottom end to a top end, for receiving the elongated adjusting leg, including a first of the plurality of passageways being proximate the top end and having an internal thread adapted for engaging the upper longitudinal threaded section of the elongated adjusting leg, and a second of the plurality of passageways disposed between the first of the plurality of passageways and the bottom end, and having a shape adapted for engaging the collar to rotate the elongated adjusting leg about its longitudinal axis.

The upper longitudinal threaded section of the elongated adjusting leg can be inserted into the second of the plurality of passageways and without the use of tools rotated engagingly through the first passageway until the internal thread of the first passageway is free of the upper longitudinal threaded section, whereupon the second of the plurality of passageways can engage the collar of the elongated leg to form an assembly, the upper longitudinal threaded section of the assembly can be inserted into the threaded receptacle, the locking hub of the assembly can be rotated in a threading direction to engage the upper longitudinal threaded section to a suitable depth in the threaded receptacle to facilitate leveling the appliance, and the locking hub can be disengaged from the collar moving upwardly to allow the internal thread of the first of the plurality of passageways to rotatingly engage the upper longitudinal threaded section of the elongated adjusting leg until the top end of the locking hub matingly engages the threaded receptacle to fasten the leg in the threaded receptacle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein:

FIG. 1 is a perspective view of a locking hub of the leveling device of the present invention;

FIG. 2 is a cross sectional view of the locking hub taken along the line 2-2 of FIG. 1 showing three passageways extending from a bottom end to a top end of the locking hub for receiving the elongated adjusting leg, with a first of said three passageways extending from the bottom end, a second of said passageways having a shape adapted for engaging the collar, and a third of said passageways disposed between the second of said passageways and the top end, said third of said three passageways having an internal thread adapted for engaging an upper longitudinal threaded section of the elongated adjusting leg;

FIGS. 3, 3A-3B are bottom views of the locking hub with three peripheral configurations and showing particularly the polygonal recess of the locking hub adapted for receiving the collar, and FIG. 3C is a cross sectional view of the locking hub taken along the line 3C-3C of FIG. 3B;

FIG. 4 is a perspective view of the locking hub engaged with the threaded section of the elongated adjusting leg and further showing the integral collar having a polygonal shape when viewed from an axially along the adjusting leg;

FIG. 5 is a fragmentary cut away perspective view of the leveling device of the present invention showing the locking hub engaging the collar independent of the threaded section of the adjusting leg;

FIG. 6 is a cross sectional elevation view of the leveling device of the present invention showing the locking hub about to engage the collar and the threaded passageway of the locking hub free of the threaded section of the elongated leg;

DETAILED DESCRIPTION OF THE INVENTION

Figure 7:
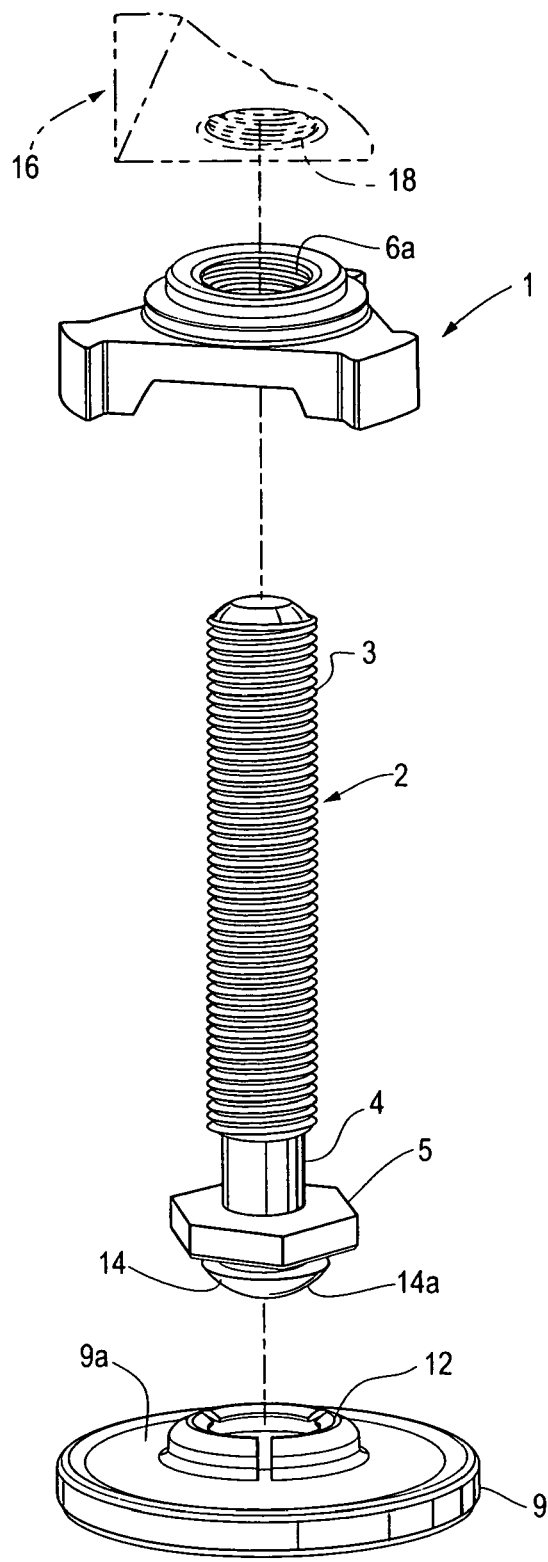
FIG. 7 is an exploded perspective view of the leveling device with a ball and socket joint for connecting an elongated adjusting leg with an integral collar disposed between a threaded section and a spherical segment of a sphere, and a base with a centrally disposed socket for receiving the spherical segment of the sphere on a top side of said base.
Figure 8:
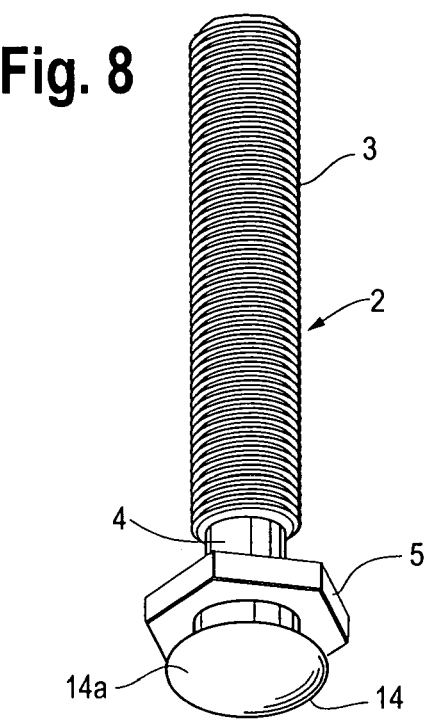
FIG. 8 is another perspective view of the elongated adjusting leg of the leveling device with the ball and socket joint showing the spherical segment of the sphere disposed on the bottom end of said leg.
Figure 9:
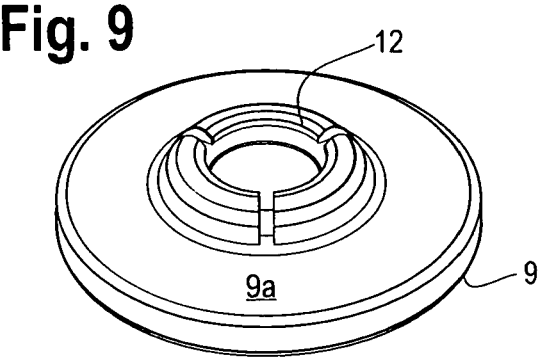
FIG. 9 is a perspective view of the base showing particularly the socket sized to receive and retain the spherical segment of the sphere.

The preferred embodiments depicted in the drawing comprise the improved leveling device for use with an appliance having a threaded receptacle for receiving an elongated adjusting leg. Without departing from the generality of the invention disclosed herein and without limiting the scope of the invention, the discussion that follows, will refer to the invention as depicted in the drawing. The term appliance is meant to encompass various types of equipment and apparatus, such as but not limited to large commercial and residential appliances, office furniture, business machines, manufacturing and communication machines and equipment, display and storage equipment, and the like.

An improved leveling device for use with an appliance having a threaded receptacle for receiving an elongated adjusting leg, wherein the improvement comprises the elongated adjusting leg 2 having an upper longitudinal threaded section 3 adapted for engaging the threaded receptacle 18, an intermediate section free of threads 4, and a lower section with an integral collar 5; and a locking hub. The locking hub 1 has a plurality of axial passageways extending from a bottom end 1b to a top end, for receiving the elongated adjusting leg, including a first of the plurality of passageways 6 being proximate the top end 1a and has an internal thread 6a adapted for engaging the upper longitudinal threaded section 3 of the elongated adjusting leg, and a second of the plurality of passageways 7 being disposed between the first of the plurality of passageways 6 and the bottom end, and has a shape adapted for engaging the collar 5 to rotate the elongated adjusting leg 2 about its longitudinal axis.

Thus, the upper longitudinal threaded section 3 of the elongated adjusting leg 2 can be inserted into the second of the plurality of passageways 7 and rotated engagingly through the first passageway until the internal thread 6a of the first passageway is free of the upper longitudinal threaded section, whereupon the second of the plurality of passageways 7 can engage the collar 5 of the elongated leg to form an assembly, the upper longitudinal threaded section 3 of the assembly can be inserted into the threaded receptacle 18, the locking hub 1 of the assembly can be rotated in a threading direction to engage the upper longitudinal threaded section 3 to a suitable depth in the threaded receptacle 18 to facilitate leveling the appliance 16, and the locking hub 1 can be disengaged from the collar 5 moving upwardly to allow the internal thread 6a of the first of the plurality of passageways 6 to rotatingly engage the upper longitudinal threaded section 3 of the elongated adjusting leg 2 until the top end 1a of the locking hub 1 matingly engages the threaded receptacle 18 to fasten the leg in the threaded receptacle 18.

As best shown in FIG. 2, the plurality of axial passageways of the locking hub 1 may further comprise a third of the plurality of passageways 8 disposed between the second of the plurality of passageways 7 and the bottom end. The third of the plurality of passageways 8 has transverse dimensions measured in all directions that are greater than directionally corresponding transverse dimensions of the second of the plurality of passageways, so that the collar 5 of the elongated adjusting leg 2 can be introduced into the second of the plurality of passageways 7 free of interference from a border of the third of the plurality of passageways.

Referring to FIGS. 1-3C, the plurality of axial passageways in the locking hub 1 are preferably centrally disposed. The locking hub, as shown in FIG. 3A may have a generally circular peripheral edge that is radially disposed from an axis of the plurality of axial passageways, or the locking hub 1 may have a peripheral edge that is radially disposed from an axis of the plurality of axial passageways that is polygonal in shape, as shown in FIGS. 3 and 3B.

The improved leveling device of this important invention has an elongated adjusting leg 2 with a collar 5 having a maximum transverse dimension that is greater than the major diameter of the upper longitudinal threaded section. The major diameter on a straight thread is that of the major cylinder. On a taper thread the major diameter at a given position on the thread axis is that of the major cone at that position. The major cylinder is the imaginary cylinder that would bound the crests of an external straight thread or the root of an internal straight thread. The major cone is the imaginary cone that would bound the crests of an eternal taper thread or the roots of an internal taper thread. Moreover, the intermediate section has a maximum transverse dimension that is less than the minor diameter of the upper longitudinal threaded section, as best shown in FIG. 6. Additionally, the elongated adjusting leg 2 may have a radially expanded base 9 disposed on a lower end thereof, as shown in FIGS. 4-6. The base 9 has a top surface 9a facing the collar 5 and a bottom surface 9b adapted for contact with a floor. The bottom surface 9b of the base 9 may have a pad 10 disposed thereon for protecting the floor. Again referring to FIGS. 4-6, the base 9 and the collar 5 may be an integral member, and the base 9, the collar 5 and the elongated adjusting leg 2 may be an integral article.

As shown in FIG. 7, the improved leveling device may comprise a distinct base 9 having a top surface 9a and a bottom surface 9b that is adapted for contact with a floor. The base 9 has a socket 12 disposed centrally on the top surface 9a and the elongated adjusting leg 2 has a ball 14 disposed on a lower end thereof. The ball 14 is adapted to fit in the socket 12 so that the ball 14 and socket 12 form a joint in which the elongated adjusting leg 2 is limited to swiveling in the socket 12 of the base 9. The term ball is meant to include any spherical or almost spherical body, including but not limited to a spherical segment 14a of a sphere. The ball end of the leg may be designed to snap fit into a socket 12 of the base 9. Those skilled in the art will appreciate that other known means of attachment may be employed.

Figure 10:
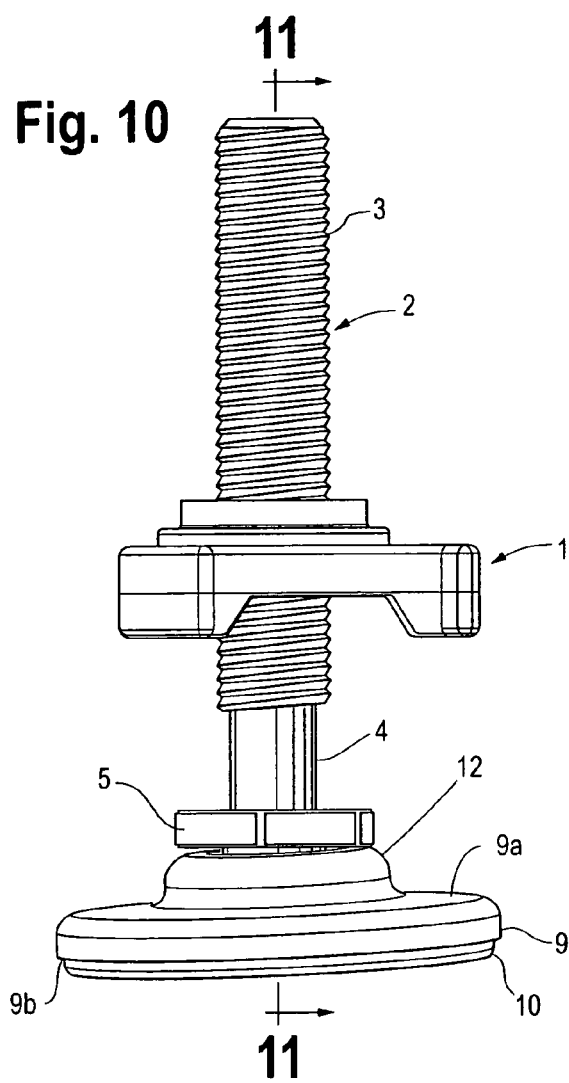
FIG. 10 is a side elevation view of the leveling device of the present invention with the ball and socket joint showing the spherical segment of the sphere disposed in the socket portion of the base and the locking hub engaged to the threaded section of the elongated adjusting leg.
Figure 11:
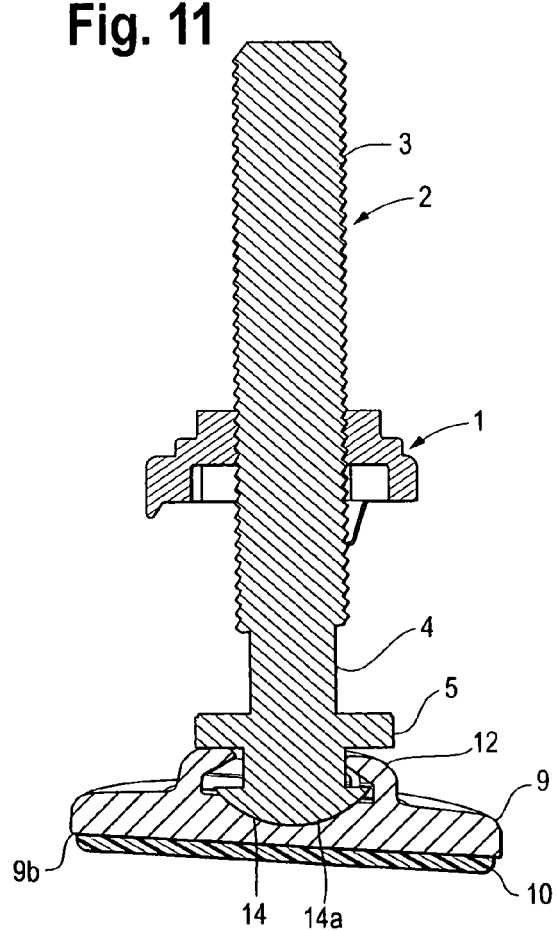
FIG. 11 is a cross sectional view taken along the line 11-11 of FIG. 10 showing the relationship of the ball and socket joint and the relative movement of the base and the elongated adjusting leg.

As best shown in FIGS. 7, 10 and 11, the ball 14 may be a spherical segment 14a of a sphere and the socket 12 is adapted to receive the spherical segment 14a of a sphere and permit the elongated adjusting leg 2 to rotate and tilt relative to the base 9.

Preferably, the improved leveling device for use with an appliance 16 has a threaded receptacle 18 for receiving an elongated adjusting leg, wherein the improvement comprises the elongated adjusting leg 2 having an upper longitudinal threaded section 3 adapted for engaging the threaded receptacle 18, an intermediate section free of threads 4, and a lower section with an integral collar 5, a locking hub 1 and a base 9, as shown in FIGS. 7-11. The elongated adjusting leg 2 has a spherical segment 14a of a sphere disposed on a lower end thereof. The locking hub, with a plurality of axial passageways extending from a bottom end 1b to a top end, for receiving the elongated adjusting leg, has a first of the plurality of passageways 6 is proximate the top end 1a and has an internal thread 6a adapted for engaging the upper longitudinal threaded section 3 of the elongated adjusting leg, and a second of the plurality of passageways 7 is disposed between the first of the plurality of passageways 6 and the bottom end, and has a shape adapted for engaging the collar 5 to rotate the elongated adjusting leg 2 about its longitudinal axis. The base 9 has a top surface 9a and a bottom surface 9b that is adapted for contact with a floor with a socket 12 disposed centrally on the top surface 9a that is adapted to receive the spherical segment 14a of a sphere and permit the elongated adjusting leg 2 to rotate and tilt relative to the base 9 so that a ball and socket joint is made in which the elongated adjusting leg 2 is limited to swiveling in the socket 12 of the base 9.

Thus, the upper longitudinal threaded section 3 of the elongated adjusting leg 2 can be inserted into the second of the plurality of passageways 7 and screwed through the first of the plurality of passageways 6 until the internal thread 6a of the first passageway is free of the upper longitudinal threaded section, whereupon the second passageway can engage the collar 5 of the elongated leg to form an assembly, the upper longitudinal threaded section 3 of the assembly can be inserted into the threaded receptacle 18, the locking hub 1 of the assembly can be rotated in a threading direction to engage the upper longitudinal threaded section 3 to a suitable depth in the threaded receptacle 18 to facilitate leveling the appliance 16, and the locking hub 1 can be disengaged from the collar 5 moving upwardly to allow the first of the plurality of passageways 6 with the internal thread 6a to rotatingly engage the upper longitudinal threaded section 3 of the elongated adjusting leg 2 until the top end 1a of the locking hub 1 is be urged against the threaded receptacle 18 to fasten the leg in the threaded receptacle 18.

In another preferred embodiment of the improved leveling device for use with an appliance 16 having a threaded receptacle 18 for receiving an elongated adjusting leg, the improvement comprises the elongated adjusting leg 2 has an upper longitudinal threaded section 3 adapted for engaging the threaded receptacle 18, an intermediate section free of threads 4, and a lower section with an integral collar 5, a locking hub 1 and a base 9. The elongated adjusting leg 2 has a spherical segment 14a of a sphere disposed on a lower end thereof. The locking hub, with a plurality of axial passageways extending from a bottom end 1b to a top end, for receiving the elongated adjusting leg, has a first of the plurality of passageways 6 is proximate the top end 1a and has an internal thread 6a adapted for engaging the upper longitudinal threaded section 3 of the elongated adjusting leg, a second of the plurality of passageways 7 is disposed between the first of the plurality of passageways 6 and the bottom end, and has a shape adapted for engaging the collar 5 to rotate the elongated adjusting leg 2 about its longitudinal axis, and a third of the plurality of passageways 8 is disposed between the second of the plurality of passageways 7 and the bottom end, the third of the plurality of passageways 8 having a minimum transverse dimension that is greater than a maximum transverse dimension of the second of the plurality of passageways, so that the collar 5 of the elongated adjusting leg 2 can be introduced into the second of the plurality of passageways 7 free of interference from a border of the third of the plurality of passageways, as best shown in FIG. 2.

The base 9 has a top surface 9a and a bottom surface 9b that is adapted for contact with a floor with a socket 12 disposed centrally on the top surface 9a that is adapted to receive the spherical segment 14a of a sphere and permit the elongated adjusting leg 2 to rotate and tilt relative to the base 9 so that a ball and socket joint is made in which the elongated adjusting leg 2 is limited to swiveling in the socket 12 of the base 9, as shown in FIGS. 10-11. In this way, the upper longitudinal threaded section 3 of the elongated adjusting leg 2 can be inserted into the third and the second of the plurality of passageways 7 and screwed through the first of the plurality of passageways 6 until the internal thread 6a of the first passageway is free of the upper longitudinal threaded section, whereupon the second passageway can engage the collar 5 of the elongated leg to form an assembly, the upper longitudinal threaded section 3 of the assembly can be inserted into the threaded receptacle 18, the locking hub 1 of the assembly can be rotated in a threading direction to engage the upper longitudinal threaded section 3 to a suitable depth in the threaded receptacle 18 to facilitate leveling the appliance 16, and the locking hub 1 can be disengaged from the collar 5 moving upwardly to allow the first of the plurality of passageways 6 with the internal thread 6a to rotatingly engage the upper longitudinal threaded section 3 of the elongated adjusting leg 2 until the top end 1a of the locking hub 1 is be urged against the threaded receptacle 18 to fasten the leg in the threaded receptacle 18.

To accommodate the multiple threaded receptacles 18 of standard appliances 16, such as clothes washer and dryers, stoves, dishwashers and refrigerators, an improved leveling system is provided for use with an appliance 16 having a plurality of threaded receptacles that each receive an elongated adjusting leg, wherein the improvement comprises a plurality of elongated adjusting legs equal in number to the number of the plurality of threaded receptacles, each of the plurality of elongated adjusting legs having an upper longitudinal threaded section 3 adapted for engaging one of the plurality of threaded receptacles, an intermediate section free of threads 4, and a lower section with an integral collar 5; and a plurality of locking hubs equal in number to the number of the plurality of elongated adjusting legs, each of the plurality of locking hubs has a plurality of axial passageways extending from a bottom end 1b to a top end 1a for receiving the elongated adjusting leg, having a first of the plurality of passageways 6 is proximate the top end 1a and has an internal thread 6a adapted for engaging the upper longitudinal threaded section 3 of the elongated adjusting leg, and a second of the plurality of passageways 7 is disposed between the first of the passageways and the bottom end 1b and has a shape adapted for engaging the collar 5 to rotate the elongated adjusting leg 2 about its longitudinal axis.

Whereby, the upper longitudinal threaded section 3 of each of the plurality of elongated adjusting legs can be inserted into the second of the plurality of passageways and then rotatingly through the first of the plurality of passageways 6 of one of the plurality of locking hubs until the internal thread 6a of the first passageway is free of the upper longitudinal threaded section, whereupon the second of the plurality of passageways 7 engages the collar 5 of the leg to form one of a plurality of assemblies, the upper longitudinal threaded section 3 of each of the plurality of assemblies can be inserted into one of the plurality of threaded receptacles, each of plurality of locking hubs forming a part of one of the plurality of assemblies can be rotated in a threading direction to engage the upper longitudinal threaded section 3 of each of the plurality of elongated adjusting legs to a suitable depth in one of the plurality of threaded receptacles to level the appliance 16, and each of the plurality of locking hubs can be disengaged from the collar 5 and moved upwardly to allow the internal thread 6a of the first of the plurality of passageways 6 to rotatingly engage the upper longitudinal threaded section 3 of the elongated adjusting leg 2 and the top end 1a of each of the plurality of locking hubs can be urged against one of the plurality of threaded receptacles to keep the leg from rotating in the receptacle.

Moreover, a method of leveling an appliance having a threaded receptacle for receiving an elongated adjusting leg is taught by the present invention. The method comprises the steps of:

inserting an upper longitudinal threaded section of the elongated adjusting leg into a second of a plurality of axial passageways that is proximate a bottom end of a locking hub having plurality of axial passageways extending from a bottom end to a top end, for receiving the elongated adjusting leg;

engagingly rotating the elongated adjusting leg through a first passageway of the locking hub until the internal thread of the first passageway is free of an upper longitudinal threaded section of the elongated adjusting leg;

engaging a collar disposed on a lower section of the elongated leg with the second of the plurality of passageways to form an assembly;

inserting the upper longitudinal threaded section of the assembly into the threaded receptacle;

rotating the locking hub of the assembly in a threading direction engaging the upper longitudinal threaded section to a suitable depth in the threaded receptacle to facilitate leveling the appliance;

fastening the leg in the threaded receptacle by disengaging the locking hub from the collar and moving the locking hub upwardly to allow the internal thread of the first of the plurality of passageways to rotatingly engage the upper longitudinal threaded section of the elongated adjusting leg until the top end of the locking hub matingly engages the threaded receptacle.

A preferred method of leveling an appliance having a threaded receptacle for receiving an elongated adjusting leg, comprises the steps of:

inserting an upper longitudinal threaded section of the elongated adjusting leg into a second and a third of a plurality of axial passageways that are proximate a bottom end of a locking hub having plurality of axial passageways extending from a bottom end to a top end, for receiving the elongated adjusting leg, with the third of the plurality of passageways being disposed between the second of the plurality of passageways and the bottom end and having transverse dimensions measured in all directions that are greater than directionally corresponding transverse dimensions of the second of the plurality of passageways, so that the collar of the elongated adjusting leg can be introduced into the second of the plurality of passageways free of interference from a border of the third of the plurality of passageways;

engagingly rotating the elongated adjusting leg through a first passageway of the locking hub until the internal thread of the first passageway is free of an upper longitudinal threaded section of the elongated adjusting leg;

engaging a collar disposed on a lower section of the elongated leg with the second of the plurality of passageways to form an assembly;

inserting the upper longitudinal threaded section of the assembly into the threaded receptacle;

rotating the locking hub of the assembly in a threading direction engaging the upper longitudinal threaded section to a suitable depth in the threaded receptacle to facilitate leveling the appliance;

fastening the leg in the threaded receptacle by disengaging the locking hub from the collar and moving the locking hub upwardly to allow the internal thread of the first of the plurality of passageways to rotatingly engage the upper longitudinal threaded section of the elongated adjusting leg until the top end of the locking hub matingly engages the threaded receptacle.

Another preferred method of leveling an appliance having a plurality of threaded receptacles that each receive an elongated adjusting leg, comprising the steps of:

inserting an upper longitudinal threaded section of each of the plurality of elongated adjusting legs into a second of a plurality of axial passageways that is proximate a bottom end of one of a plurality of locking hubs, each having a plurality of axial passageways extending from a bottom end to a top end, for receiving the elongated adjusting leg;

engagingly rotating each of the plurality of elongated adjusting legs through a first of the plurality of axial passageways until the internal thread of the first of the plurality of axial passageways is free of an upper longitudinal threaded section of the each of the plurality of elongated adjusting legs;

engaging a collar disposed on a lower section of each of the plurality of elongated legs with one of the second of the plurality of passageways to form a plurality of assemblies;

inserting the upper longitudinal threaded section of each of the plurality of assemblies into one of the plurality of threaded receptacles;

rotating the locking hub of each of the plurality of assemblies in a threading direction engaging the upper longitudinal threaded section of each of the plurality of elongated adjusting legs to a suitable depth in one of the plurality of threaded receptacles to facilitate leveling the appliance;

keeping each of the plurality of elongated adjusting legs in each of the plurality of threaded receptacles from loosening by disengaging each of the plurality of locking hubs from each of the plurality of collars and moving each of the plurality of locking hubs upwardly to allow the internal thread of the first of the plurality of passageways in each of the plurality of locking hubs to rotatingly engage the upper longitudinal threaded section of each of the plurality of elongated adjusting legs until the top end of each of the plurality of locking hubs matingly engages one of the plurality of threaded receptacles.

Another method of leveling an appliance having a plurality of threaded receptacles that each receive an elongated adjusting leg, comprises the steps of:

inserting an upper longitudinal threaded section of each of the plurality of elongated adjusting legs into a third and a second of a plurality of axial passageways that are proximate a bottom end of one of a plurality of locking hubs, each having a plurality of axial passageways extending from a bottom end to a top end with a first of the plurality of axial passageways being proximate the top end, the second of the plurality of axial passageways being disposed between the first of the plurality of axial passageways and the bottom end, and the third of the plurality of axial passageways being disposed between the second of the plurality of axial passageways and the bottom end, said first of the plurality of passageways being proximate the top end and having an internal thread adapted for engaging the upper longitudinal threaded section of the elongated adjusting leg, said second of the plurality of passageways being disposed between the first of the plurality of passageways and the bottom end, and having a shape adapted for engaging the collar to rotate the elongated adjusting leg about its longitudinal axis, and said third of the plurality of passageways having a minimum transverse dimension that is greater than a maximum transverse dimension of the second of the plurality of passageways, so that the collar of the elongated adjusting leg can be introduced into the second of the plurality of passageways free of interference from a border of the third of the plurality of passageways;

engagingly rotating each of the plurality of elongated adjusting legs through the first of the plurality of axial passageways until the internal thread of the first of the plurality of axial passageways is free of an upper longitudinal threaded section of the each of the plurality of elongated adjusting legs;

engaging a collar disposed on a lower section of each of the plurality of elongated legs with one of the second of the plurality of passageways to form a plurality of assemblies;

inserting the upper longitudinal threaded section of each of the plurality of assemblies into one of the plurality of threaded receptacles;

rotating the locking hub of each of the plurality of assemblies in a threading direction engaging the upper longitudinal threaded section of each of the plurality of elongated adjusting legs to a suitable depth in one of the plurality of threaded receptacles to facilitate leveling the appliance; and keeping each of the plurality of elongated adjusting legs in each of the plurality of threaded receptacles from loosening by disengaging each of the plurality of locking hubs from each of the plurality of collars and moving each of the plurality of locking hubs upwardly to allow the internal thread of the first of the plurality of passageways in each of the plurality of locking hubs to rotatingly engage the upper longitudinal threaded section of each of the plurality of elongated adjusting legs until the top end of each of the plurality of locking hubs matingly engages one of the plurality of threaded receptacles.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, including variations in size, materials, shape, form, function and manner of operation, assembly and use, and all equivalent relationships to those illustrated in the drawings and described in the specification, that would be deemed readily apparent and obvious to one skilled in the art, are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An improved leveling device for use with an appliance having a threaded receptacle for receiving an elongated adjusting leg, wherein the improvement comprises:
    a. the elongated adjusting leg has an upper longitudinal threaded section adapted for engaging the threaded receptacle, an intermediate section free of threads, and a lower section with an integral collar; and
    b. a locking hub, with a plurality of axial passageways extending from a bottom end to a top end, for receiving the elongated adjusting leg, having
        1) a first of said plurality of passageways is proximate the top end and has an internal thread adapted for engaging the upper longitudinal threaded section of the elongated adjusting leg, and
        2) a second of said plurality of passageways is disposed between the first of said plurality of passageways and the bottom end, and has a shape adapted for engaging the collar to rotate the elongated adjusting leg about its longitudinal axis,
    whereby, the upper longitudinal threaded section of the elongated adjusting leg can be inserted into the second of said plurality of passageways and rotated engagingly through the first passageway until the internal thread of the first passageway is free of the upper longitudinal threaded section, whereupon the second of said plurality of passageways can engage the collar of the elongated leg to form an assembly, the upper longitudinal threaded section of the assembly can be inserted into the threaded receptacle, the locking hub of the assembly can be rotated in a threading direction to engage the upper longitudinal threaded section to a suitable depth in the threaded receptacle to facilitate leveling the appliance, and the locking hub can be disengaged from the collar moving upwardly to allow the internal thread of the first of said plurality of passageways to rotatingly engage the upper longitudinal threaded section of the elongated adjusting leg until the top end of the locking hub matingly engages the threaded receptacle to fasten the leg in the threaded receptacle.

2. The improved leveling device of claim 1, wherein the plurality of axial passageways further comprises a third of said plurality of passageways that is disposed between the second of said plurality of passageways and the bottom end, said third of said plurality of passageways having transverse dimensions measured in all directions that are greater than directionally corresponding transverse dimensions of the second of said plurality of passageways, so that the collar of the elongated adjusting leg can be introduced into the second of said plurality of passageways free of interference from a border of the third of said plurality of passageways.

3. The improved leveling device of claim 1, wherein the plurality of axial passageways in the locking hub are centrally disposed.

4. The improved leveling device of claim 1, wherein the locking hub has a generally circular peripheral edge that is radially disposed from an axis of the plurality of axial passageways.

5. The improved leveling device of claim 1, wherein the locking hub has a peripheral edge that is radially disposed from an axis of the plurality of axial passageways that is polygonal in shape.

6. The improved leveling device of claim 1, wherein the collar has a maximum transverse dimension that is greater than the major diameter of the upper longitudinal threaded section.

7. The improved leveling device of claim 1, wherein the intermediate section has a maximum transverse dimension that is less than the minor diameter of the upper longitudinal threaded section.

8. The improved leveling device of claim 1, wherein the elongated adjusting leg has a radially expanded base disposed on a lower end thereof.

9. The improved leveling device of claim 8, wherein the base has a top surface facing the collar and a bottom surface adapted for contact with a floor.

10. The improved leveling device of claim 9, wherein the bottom surface of the base has pad disposed thereon for protecting the floor.

11. The improved leveling device of claim 8, wherein the base and the collar are an integral member.

12. The improved leveling device of claim 8, wherein the base, the collar and the elongated adjusting leg are an integral article.

13. The improved leveling device of claim 1, further comprising a base having a top surface and a bottom surface that is adapted for contact with a floor.

14. The improved leveling device of claim 13, wherein the base has a socket disposed centrally on the top surface and the elongated adjusting leg has a ball disposed on a lower end thereof, said ball being adapted to fit in said socket so that the ball and socket form a joint in which the elongated adjusting leg is limited to swiveling in the socket of the base.

15. The improved leveling device of claim 14, wherein the ball is a spherical segment of a sphere and the socket is adapted to receive the spherical segment of a sphere and permit the elongated adjusting leg to rotate and tilt relative to the base.

16. An improved leveling device for use with an appliance having a threaded receptacle for receiving an elongated adjusting leg, wherein the improvement comprises:
   a. the elongated adjusting leg has an upper longitudinal threaded section adapted for engaging the threaded receptacle, an intermediate section free of threads, and a lower section with an integral collar,
      1) the elongated adjusting leg having a spherical segment of a sphere disposed on a lower end thereof;
   b. a locking hub, with a plurality of axial passageways extending from a bottom end to a top end, for receiving the elongated adjusting leg, having
      1) a first of said plurality of passageways is proximate the top end and has an internal thread adapted for engaging the upper longitudinal threaded section of the elongated adjusting leg, and
      2) a second of said plurality of passageways is disposed between the first of said plurality of passageways and the bottom end, and has a shape adapted for engaging the collar to rotate the elongated adjusting leg about its longitudinal axis; and
   c. a base having a top surface and a bottom surface that is adapted for contact with a floor,
      1) said base having a socket disposed centrally on the top surface that is adapted to receive the spherical segment of a sphere and permit the elongated adjusting leg to rotate and tilt relative to the base so that a ball and socket joint is made in which the elongated adjusting leg is limited to swiveling in the socket of the base, whereby, the upper longitudinal threaded section of the elongated adjusting leg can be inserted into the second of said plurality of passageways and screwed through the first of said plurality of passageways until the internal thread of the first passageway is free of the upper longitudinal threaded section, whereupon the second passageway can engage the collar of the elongated leg to form an assembly, the upper longitudinal threaded section of the assembly can be inserted into the threaded receptacle, the locking hub of the assembly can be rotated in a threading direction to engage the upper longitudinal threaded section to a suitable depth in the threaded receptacle to facilitate leveling the appliance, and the locking hub can be disengaged from the collar moving upwardly to allow the first of said plurality of passageways with the internal thread to rotatingly engage the upper longitudinal threaded section of the elongated adjusting leg until the top end of the locking hub is be urged against the threaded receptacle to fasten the leg in the threaded receptacle.

17. An improved leveling device for use with an appliance having a threaded receptacle for receiving an elongated adjusting leg, wherein the improvement comprises:
   a. the elongated adjusting leg has an upper longitudinal threaded section adapted for engaging the threaded receptacle, an intermediate section free of threads, and a lower section with an integral collar,
      1) the elongated adjusting leg having a spherical segment of a sphere disposed on a lower end thereof;
   c. a locking hub, with a plurality of axial passageways extending from a bottom end to a top end, for receiving the elongated adjusting leg, having
      1) a first of said plurality of passageways is proximate the top end and has an internal thread adapted for engaging the upper longitudinal threaded section of the elongated adjusting leg,
      2) a second of said plurality of passageways is disposed between the first of said plurality of passageways and the bottom end, and has a shape adapted for engaging the collar to rotate the elongated adjusting leg about its longitudinal axis, and
      3) a third of said plurality of passageways is disposed between the second of said plurality of passageways and the bottom end, said third of said plurality of passageways having a minimum transverse dimension that is greater than a maximum transverse dimension of the second of said plurality of passageways, so that the collar of the elongated adjusting leg can be introduced into the second of said plurality of passageways free of interference from a border of the third of said plurality of passageways; and
   b. a base having a top surface and a bottom surface that is adapted for contact with a floor, 1) said base having a socket disposed centrally on the top surface that is adapted to receive the spherical segment of a sphere and permit the elongated adjusting leg to rotate and tilt relative to the base so that a ball and socket joint is made in which the elongated adjusting leg is limited to swiveling in the socket of the base, whereby, the upper longitudinal threaded section of the elongated adjusting leg can be inserted into the third and the second of said plurality of passageways and screwed through the first of said plurality of passageways until the internal thread of the first passageway is free of the upper longitudinal threaded section, whereupon the second passageway can engage the collar of the elongated leg to form an assembly, the upper longitudinal threaded section of the assembly can be inserted into the threaded receptacle, the locking hub of the assembly can be rotated in a threading direction to engage the upper longitudinal threaded section to a suitable depth in the threaded receptacle to facilitate leveling the appliance, and the locking hub can be disengaged from the collar moving upwardly to allow the first of said plurality of passageways with the internal thread to rotatingly engage the upper longitudinal threaded section of the elongated adjusting leg until the top end of the locking hub is be urged against the threaded receptacle to fasten the leg in the threaded receptacle.

18. An improved leveling system for use with an appliance having a plurality of threaded receptacles that each receive an elongated adjusting leg, wherein the improvement comprises:

a. a plurality of elongated adjusting legs equal in number to the number of said plurality of threaded receptacles, each of the plurality of elongated adjusting legs having an upper longitudinal threaded section adapted for engaging one of the plurality of threaded receptacles, an intermediate section free of threads, and a lower section with an integral collar; and b. a plurality of locking hubs equal in number to the number of said plurality of elongated adjusting legs, each of said plurality of locking hubs has a plurality of axial passageways extending from a bottom end to a top end for receiving the elongated adjusting leg, each having 1) a first of said plurality of passageways is proximate the top end and has an internal thread adapted for engaging the upper longitudinal threaded section of the elongated adjusting leg, and 2) a second of said plurality of passageways is disposed between the first of said passageways and the bottom end and has a shape adapted for engaging the collar to rotate the elongated adjusting leg about its longitudinal axis, whereby, the upper longitudinal threaded section of each of the plurality of elongated adjusting legs can be inserted into the second of said plurality of passageways and then rotatingly through the first of said plurality of passageways of one of the plurality of locking hubs until the internal thread of the first passageway is free of the upper longitudinal threaded section, whereupon the second of said plurality of passageways engages the collar of the leg to form one of a plurality of assemblies, the upper longitudinal threaded section of each of the plurality of assemblies can be inserted into one of the plurality of threaded receptacles, each of plurality of locking hubs forming a part of one of the plurality of assemblies can be rotated in a threading direction to engage the upper longitudinal threaded section of each of the plurality of elongated adjusting legs to a suitable depth in one of the plurality of threaded receptacles to level the appliance, and each of said plurality of locking hubs can be disengaged from the collar and moved upwardly to allow the internal thread of the first of said plurality of passageways to rotatingly engage the upper longitudinal threaded section of the elongated adjusting leg and the top end of each of said plurality of locking hubs can be urged against one of the plurality of threaded receptacles to keep the leg from rotating in the receptacle.

19. A method of leveling an appliance having a threaded receptacle for receiving an elongated adjusting leg, comprising the steps of:

a. inserting an upper longitudinal threaded section of the elongated adjusting leg into a second of a plurality of axial passageways that is proximate a bottom end of a locking hub having plurality of axial passageways extending from a bottom end to a top end, for receiving the elongated adjusting leg;

b. engagingly rotating the elongated adjusting leg through a first passageway of the locking hub until the internal thread of the first passageway is free of an upper longitudinal threaded section of the elongated adjusting leg;

c. engaging a collar disposed on a lower section of the elongated leg with the second of said plurality of passageways to form an assembly;

d. inserting the upper longitudinal threaded section of the assembly into the threaded receptacle;

e. rotating the locking hub of the assembly in a threading direction engaging the upper longitudinal threaded section to a suitable depth in the threaded receptacle to facilitate leveling the appliance; and f. fastening the leg in the threaded receptacle by:

i) disengaging the locking hub from the collar, and ii) moving the locking hub upwardly to allow the internal thread of the first of said plurality of passageways to rotatingly engage the upper longitudinal threaded section of the elongated adjusting leg until the top end of the locking hub matingly engages the threaded receptacle.

20. A method of leveling an appliance having a threaded receptacle for receiving an elongated adjusting leg, comprising the steps of:

a. inserting an upper longitudinal threaded section of the elongated adjusting leg into a second and a third of a plurality of axial passageways that are proximate a bottom end of a locking hub having plurality of axial passageways extending from a bottom end to a top end, for receiving the elongated adjusting leg, with the third of said plurality of passageways being disposed between the second of said plurality of passageways and the bottom end and having transverse dimensions measured in all directions that are greater than directionally corresponding transverse dimensions of the second of said plurality of passageways, so that the collar of the elongated adjusting leg can be introduced into the second of said plurality of passageways free of interference from a border of the third of said plurality of passageways;

b. engagingly rotating the elongated adjusting leg through a first passageway of the locking hub until the internal thread of the first passageway is free of an upper longitudinal threaded section of the elongated adjusting leg;
  c. engaging a collar disposed on a lower section of the elongated leg with the second of said plurality of passageways to form an assembly;
  d. inserting the upper longitudinal threaded section of the assembly into the threaded receptacle;
  e. rotating the locking hub of the assembly in a threading direction engaging the upper longitudinal threaded section to a suitable depth in the threaded receptacle to facilitate leveling the appliance; and
  f. fastening the leg in the threaded receptacle by:
    i) disengaging the locking hub from the collar, and
    ii) moving the locking hub upwardly to allow the internal thread of the first of said plurality of passageways to rotatingly engage the upper longitudinal threaded section of the elongated adjusting leg until the top end of the locking hub matingly engages the threaded receptacle.

21. A method of leveling an appliance having a plurality of threaded receptacles that each receive an elongated adjusting leg, comprising the steps of:
  a. inserting an upper longitudinal threaded section of each of the plurality of elongated adjusting legs into a second of a plurality of axial passageways that is proximate a bottom end of one of a plurality of locking hubs, each having a plurality of axial passageways extending from a bottom end to a top end, for receiving the elongated adjusting leg;
  b. engagingly rotating each of the plurality of elongated adjusting legs through a first of said plurality of axial passageways until the internal thread of the first of the plurality of axial passageways is free of an upper longitudinal threaded section of said each of the plurality of elongated adjusting legs;
  c. engaging a collar disposed on a lower section of each of the plurality of elongated legs with one of the second of the plurality of passageways to form a plurality of assemblies;
  d. inserting the upper longitudinal threaded section of each of the plurality of assemblies into one of the plurality of threaded receptacles;
  e. rotating the locking hub of each of the plurality of assemblies in a threading direction engaging the upper longitudinal threaded section of each of the plurality of elongated adjusting legs to a suitable depth in one of the plurality of threaded receptacles to facilitate leveling the appliance; and
  f. keeping each of the plurality of elongated adjusting legs in each of the plurality of threaded receptacles from loosening by:
    i) disengaging each of the plurality of locking hubs from each of the plurality of collars; and
    ii) moving each of the plurality of locking hubs upwardly to allow the internal thread of the first of said plurality of passageways in each of said plurality of locking hubs to rotatingly engage the upper longitudinal threaded section of each of the plurality of elongated adjusting legs until the top end of each of the plurality of locking hubs matingly engages one of the plurality of threaded receptacles.

22. A method of leveling an appliance having a plurality of threaded receptacles that each receive an elongated adjusting leg, comprising the steps of:
  a. inserting an upper longitudinal threaded section of each of the plurality of elongated adjusting legs into a third and a second of a plurality of axial passageways that are proximate a bottom end of one of a plurality of locking hubs, each having a plurality of axial passageways extending from a bottom end to a top end with a first of the plurality of axial passageways being proximate the top end, the second of the plurality of axial passageways being disposed between the first of the plurality of axial passageways and the bottom end, and the third of the plurality of axial passageways being disposed between the second of the plurality of axial passageways and the bottom end,
    1) said first of said plurality of passageways being proximate the top end and having an internal thread adapted for engaging the upper longitudinal threaded section of the elongated adjusting leg,
    2) said second of said plurality of passageways being disposed between the first of said plurality of passageways and the bottom end, and having a shape adapted for engaging the collar to rotate the elongated adjusting leg about its longitudinal axis, and
    3) said third of said plurality of passageways having a minimum transverse dimension that is greater than a maximum transverse dimension of the second of said plurality of passageways, so that the collar of the elongated adjusting leg can be introduced into the second of said plurality of passageways free of interference from a border of the third of said plurality of passageways;
  b. engagingly rotating each of the plurality of elongated adjusting legs through the first of said plurality of axial passageways until the internal thread of the first of the plurality of axial passageways is free of an upper longitudinal threaded section of said each of the plurality of elongated adjusting legs;
  c. engaging a collar disposed on a lower section of each of the plurality of elongated legs with one of the second of the plurality of passageways to form a plurality of assemblies;
  d. inserting the upper longitudinal threaded section of each of the plurality of assemblies into one of the plurality of threaded receptacles;
  e. rotating the locking hub of each of the plurality of assemblies in a threading direction engaging the upper longitudinal threaded section of each of the plurality of elongated adjusting legs to a suitable depth in one of the plurality of threaded receptacles to facilitate leveling the appliance; and
  f. keeping each of the plurality of elongated adjusting legs in each of the plurality of threaded receptacles from loosening by:
    i) disengaging each of the plurality of locking hubs from each of the plurality of collars, and
    ii) moving each of the plurality of locking hubs upwardly to allow the internal thread of the first of said plurality of passageways in each of said plurality of locking hubs to rotatingly engage the upper longitudinal threaded section of each of the plurality of elongated adjusting legs until the top end of each of the plurality of locking hubs matingly engages one of the plurality of threaded receptacles.

* * * * *